Oct. 7, 1958   D. E. FIELD   2,855,322
THERMOPLASTIC COMPOSITIONS AND METHOD OF MAKING SAME
Filed Dec. 9, 1954
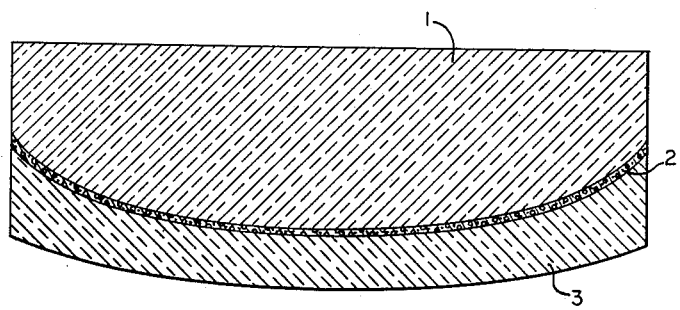
INVENTOR
DONALD E. FIELD
BY
ATTORNEYS

United States Patent Office 2,855,322
Patented Oct. 7, 1958

2,855,322

THERMOPLASTIC COMPOSITIONS AND METHOD OF MAKING SAME

Donald E. Field, Arlington, Va., assignor to the United States of America as represented by the Secretary of the Navy Application December 9, 1954, Serial No. 474,308

6 Claims. (Cl. 106—186)

(Granted under Title 35, U. S. Code (1952), sec. 266)

The invention described herein may be manufactured and used by or for the Government of the United States of America for governmental purposes without the payment of any royalties thereon or therefor.

This invention relates to new thermoplastic compositions suitable as optical cements, to a method of making the same and to optical assemblies cemented therewith.

Cellulose caprate has a number of excellent properties for use as an optical cement and has been so used in air-borne optical instruments in recent years. Cellulose caprate as a commercial product has a relatively high melting point, so high in fact that it does not meet the recommended specification for optical glass cements of being at least a fairly thin fluid at 250° F. whereby cementing of the optical elements can take place at that temperature or at a lower one. The other recommended specification for optical glass cements, that of being a rigid solid at 160° F., is easily met in commercial cellulose caprate since those which melt at 210° F. and higher will all be rigid solids at a temperature materially higher than 160° F. A further limitation in cellulose caprate as an optical glass cement is an index of refraction which is undesirably lower than that of optical glass.

The cementing of optical glass elements with cellulose caprate is identical to that using solid Canada balsam with the exception of the temperature to which the elements must be heated to obtain a fairly thin fluid condition of the cement. The temperature to which the optical glass pieces are heated should preferably not be higher than about 250° F., since above this temperature there is a tendency to cause distortion in the glass. The cellulose caprate cement has required heating the glass to temperatures considerably above this recommended upper temperature limit.

Plastic lenses, such as polystyrene and Lucite (polymethylmethacrylate) soften or deform at considerably lower temperatures than does glass. For this reason an optical cement for the bonding of plastic to plastic or plastic to glass optical elements should be capable of becoming sufficiently soft at moderately elevated temperatures e. g., up to about 125° F., to allow cementing thereat and be sufficiently place-stable at room temperature to be without flow from the bond at ordinary temperatures.

Melting point and softening point as spoken of herein and in the claims is that determined by the Ball and Shouldered Ring method, E 28–42T of A. S. T. M.; Book of A. S. T. M. Standards, part III, page 2119 (1944). The rigid solid condition as spoken of herein and in the claims is the absence of flow of the cement from the bond under an applied sheer of five ounces per square inch of the cemented interface of the optical assembly at the indicated temperature, for example, at 160° F. By a fairly thin fluid as spoken of herein and in the claims is meant a fluid condition of the cement such as will allow an easy sliding of the cemented matched pair of lenses relatively to each other by manipulation with the fingers in the manner which has been conventionally employed for removing air bubbles from fluid cement between lenses.

I have found that satisfactory optical cements of excellent properties for the bonding together of both glass to glass and plastic to plastic optical elements and as well plastic to glass optical elements can be obtained by plasticizing cellulose caprate of melting point about 210° F. and higher, for example, 240° F., with poly-α-methylstyrene and N-cyclohexyl-p-toluenesulfonamide, the latter serving as a secondary plasticizer and acting to improve the campatibility of the poly-α-methylstyrene with the cellulose caprate in the solid condition of the cement compositions.

The new thermoplastic cement compositions of my invention are solids which range in consistency from those which are tacky and have pressure-sensitive adhesive properties to those which at a temperature of about 160° F. are rigid solids. They are further characterized by melting to at least a fairly thin fluid at a temperature not above about 250° F. and have an index of refraction higher than that of the prior art cellulose caprate cement and approaching more nearly that of optical glass.

In the single figure of the accompanying drawing forming part of the description of the present invention there is shown by way of illustration of optical structures which may be made with a cement of my invention, a composite lens in which 1 is a lens of crown glass and 3 is a matching lens of flint glass bonded together by means of a thermoplastic cement 3 of the invention.

The primary plasticizer, poly-α-methylstyrene, is a water-white viscous liquid of higher index of refraction than cellulose caprate. It has good water resistance, is non-acid and stable to heat, light and aging. Cellulose caprate plasticized with it has good weathering characteristics but a slight incompatibility with the cellulose caprate was perceptible in the form of a light haziness in the cement in stick form. Haziness due to the incompatibility of the primary plasticizer with the cellulose caprate can be removed in accordance with my invention by incorporating in the new cement compositions, a small amount of the secondary plasticizer, N-cyclohexyl-p-toluenesulfonamide, which is a white solid of crystallizing point 86–87° C. with good heat and light stability and high compatibility with cellulose caprate.

The primary plasticizer functions to produce compositions of lower melting point than the cellulose caprate and of higher index of refraction than the latter, and is used in amounts sufficient to yield with the secondary plasticizer and the cellulose caprate thermoplastic cements which have the property of melting to at least a fairly thin fluid at a temperature not above about 250° F. The amount required for a particular cement composition will depend on the melting point of the cellulose caprate and the amount of secondary plasticizer present in the composition, the higher the melting point of the cellulose caprate and the greater the amount of the secondary plasticizer, the more of the primary plasticizer required to attain to a given melting point in the new cement compositions. The quantity of the primary plasticizer used will also depend on the use to which the new cement compositions are to be put. A cement for the bonding together of glass optical elements should be a rigid solid at about 160° F. and, accordingly, the amount of the primary plasticizer should not be in excess of that which would lower this solidification point for the cement compositions below about 160° F. On the other hand, where the cement is to be used for the bonding together of plastic optical elements or of the same to glass optical elements, a softer, tacky composition of lower melting point is required, for which larger amounts of the primary plasticizer are used in the composition but not such as would result in compositions which are not tacky solids at room temperatures.

The secondary plasticizer need be employed only in amounts which are sufficient to overcome incompatibility of the primary plasticizer with the cellulose caprate, although greater amounts up to an equal part with the primary plasticizer can be used if desired. Generally, suitable amounts of the secondary plasticizer in the new cement compositions will be in the ratio of from about 1:4 to 1:1 parts by weight of the primary plasticizer present therein with the ratio being at or near 1:4 for those of the cements which are to be tacky.

The amount of the two plasticizers to be used to give satisfactory results in the new cement compositions of the invention can be easily determined by simple tests by those skilled in the art. An upper limit for the amount in the aggregate for the two plasticizers is reached when they form about two-thirds by weight of the composition with the cellulose caprate. This situation applies only in the case where the cement is to be a tacky solid since a cement which is to be a rigid solid at 160° F. as defined herein has a maximum for total plasticizer content of 20% by weight of the three component composition. An example of a composition suitable as a cement for the bonding of glass to glass optical elements is cellulose caprate of melting point 240° F. plasticized with from 15 to 20 parts of poly-α-methylstyrene and 5 parts of N-cyclohexyl-p-toluenesulfonamide to each 100 parts of the cellulose caprate. These cements will form a thin fluid melt at a temperature below 250° F. and in the neighborhood of 210° F. more or less, and are sparkling clear solids at a temperature not below 160° F. Similar results are obtained when the components of the plasticized cement composition are taken in the proportion of 12 parts primary plasticizer, 8 parts secondary plasticizer and 100 parts of the cellulose caprate of melting point 240° F. The amount of the secondary plasticizer in each instance can be increased up to about equal proportion with the primary plasticizer without upsetting the valuable properties of these new cement compositions. Clear tacky solid cements for the bonding of plastic optical elements to each other or to glass optical elements can be prepared by using the primary and secondary plasticizers in the weight ratio of 4:1, 3:1, and 3:2 and plasticizing cellulose caprate of melting point 210° F. therewith in proportions which in the aggregate range from 100 to 200% by weight on the cellulose caprate. These cements will hold the optical elements together without flow of the cement from the joint at moderate temperatures, i. e., up to about 150° F.

Plasticizing of the cellulose caprate and formation of the new cement compositions can be carried out in a relatively simple manner. To the cellulose caprate in a highly pure form dissolved in a calculated large excess of toluene (C. P.) is filtered the proper proportions of the two plasticizers dissolved in a small amount of toluene (C. P.). Filtration of the plasticizers is made through either a fine porosity (F) fritted glass filter or through a Seitz bacteriological filter designed for pressure or vacuum filtration. The liquid mixture in an evaporation flask of a size sufficient to allow ample space for frothing when heated is connected to a vacuum and trap system and heated on an oil bath at 250 to 270° F. By slowly reducing the pressure on the contents of the flask, the toluene is rapidly and smoothly distilled off. Complete removal of the solvent requires a considerable heating period, for example, six hours or so, and is indicated by a cessation of frothing of the melt of the cement in the bottom of the flask. Several minutes after the frothing has ceased, the vacuum is relieved and the flask disconnected. As soon as all of the cement has run down to form a bubble-free melt, the cement is poured into suitable containers which afterward are sealed against dust for storage purposes. In the case of cements for glass to glass optical bonding, the cement melt is quickly poured into previously set up, clean, heated test tubes. If the cement becomes too viscous during the pouring operation, the flask is reheated in the oil bath. After the cement composition has cooled and solidified in the tubes, the ends of the tubes are sealed with masking tape and stored in this manner. For the purpose of removing the cast stick of cement from the tube, the heated tip of a glass rod is inserted into the cement in the tube and the arrangement allowed to cool to anchor the rod in the cement. The tube containing the cement stick is then warmed by rapidly twirling it over a low flame or by immersion in a hot oil bath until the stick of cement can be withdrawn.

An additional advantage of the new thermoplastic compositions and which pertains to the preparation of the compositions is the longer time during which the melt of the composition remains sufficiently fluid to allow pouring. With the cellulose caprate cement of the prior art it was not possible to prepare a large batch which had sufficient fluidity in the melt to allow pouring of the melt to form sticks or other cast forms of the cements. With the new cement compositions, large fully fluid batches can be prepared and pouring carried on for a time sufficient to cast a large number of, for example, two dozen or so, cement sticks before requiring reheating of the melt.

Commercial cellulose caprate is a granular powder which has to be purified to remove dirt, unreacted capric acid and cellulose, and oily impurities before use in the new cement composition. To improve its color, the purified cellulose caprate is subjected to a decolorizing treatment with a more extensive decolorizing being carried out where a higher quality cement is desired.

One method of purifying the commercial cellulose caprate is to subject it for an extensive period to solvent extraction in a Soxhlet type extraction apparatus, for example, for about 48 hours with a mixture of 80 parts by volume methyl alcohol and 20 parts by volume water. The extracted material supported on filter paper or a clay plate is air-dried under a hood for several hours and then dried in an oven at 150° F. overnight or in a vacuum oven for at least three hours. The dried material is stored under dry conditions for example, in a desiccator. It is essential that the cellulose caprate be as nearly dry as possible since the presence of even traces of moisture decreases the activity of the adsorbent used in the decolorizing treatment.

Decolorizing of the purified cellulose caprate can be carried out in accordance with known general practice for decolorizing of solutions, the cellulose caprate dissolved in a suitable solvent, for example, toluene (C. P.) being passed through one or more adsorption columns packed with granular solid adsorbent. If the cellulose caprate coming from one of the adsorption columns is to be removed from its solvent before being subjected to adsorption in a succeeding column, a water-soluble solvent, for example, dry technical dioxane, is used as the solvent for the cellulose caprate and separation of the latter from the solvent is accomplished by drowning the mass in a bath of water containing an equal volume of methyl alcohol, separating out the precipitated partially decolorized cellulose caprate, drying it as above, and redissolving it in a dry solvent and passing it through the succeeding adsorption column. Suitable adsorbents are granular activated magnesia and activated alumina. In a two column system, the first adsorption column preferably is packed with a mixture of activated magnesia and activated alumina in the volume ratio of 3 to 1 and the second column with a mixture of the same adsorbents in the reverse volume ratio of 1 to 3 with a granular size for the magnesia of 8 to 48 mesh and for the alumina (grade F-20) of 80 to 200 mesh. Celite analytical filter aid (a diatomaceous earth) added to the adsorbents promotes uniform packing and free flow of the liquid. The second column preferably contains a quantity of the filter aid in admixture therewith in the proportions of about 70% on the volume of the alumina. The rate of flow of the solvent solution of the cellulose caprate through a single adsorption column system is about 5–10 ml. per minute for a 4 foot by 1.5 inch diameter column packed with the mixture of magnesia and alumina (1 to 3) and filter aid as above. Using a two column adsorption system in which the columns are also 4 foot by 1.5 inch diameter and the first of which is packed with a mixture of the magnesia and alumina in the ratio of 3 to 1 and the second is packed as in the case of the one column system just described, the rate of flow of the cellulose caprate solution through the first column is about 10–20 ml. per minute and through the second column about 5–10 ml. per minute. The total solution flow through any one of the columns should not exceed 1200 ml. without washing and reactivation of the adsorbent.

The decolorized dry solution of the purified cellulose caprate may be directly filtered into the evaporation flask preparatory to mixing it with the plasticizers in the preparation of the cement of the invention. Filtration of the solvent solution of the purified cellulose caprate may be carried out in the conventional manner for the making of optical cements or in other way found suitable for the purpose. The extent of the filtration will depend on the quality of the cement desired. A recommended concentration of the cellulose caprate in the toluene for filtration purposes is about 15 grams per 100 ml. of the solvent.

If the solution of cellulose caprate in toluene has passed through adsorbents or has otherwise been handled in a manner resulting in a solution of unknown quantity of cellulose caprate, then the amount of the latter per unit volume of solution must be determined in order that the correct ratio of the primary plasticizer may be added. This determination is made by comparing the index of refraction and the specific gravity of a standard solution containing 15 grams of the cellulose caprate in 100 ml. of toluene with the corresponding values for the solution to be processed, readings being taken at the same temperature, and adjusting the concentration of the cellulose caprate in the solution to be processed to meet the values for the standard solution, either through addition or evaporation of toluene. An Abbe refractometer is used to measure the refractive index and a hydrometer reading from .800 to .910 to measure the specific gravity of the solutions. The hydrometer alone may be used if a refractometer is not available. Whereas the specific gravity varies directly, the refractive index varies indirectly with the concentration of the cellulose caprate in the solution.

The preparation of the new cement composition of the invention is illustrated by the following specific examples. Parts are by weight unless otherwise noted.

*Example 1*

A decolorized toluene solution of cellulose caprate of melting point 240° F. which has been purified by extraction with a methyl alcohol-water mixture in the manner described above, the solution being contained in a 2-liter evaporation flask to the extent of filling the flask to not more than three-quarters full, has added thereto through an F fritted glass filter, or though a Seitz bacteriological filter, a solution of the two plasticizers in a small amount of toluene (C. P.). The plasticizers are added to the cellulose caprate solution in the ratio of 4 parts of the poly-α-methylstyrene and 1 part of N-cyclohexyl-p-toluenesulfonamide for each 20 parts of the cellulose caprate in the solution. The liquid mixture is then heated under a vacuum to evaporate off the toluene in the manner described above. When frothing has ceased and the cement run down in the flask as a bubble-free melt, the cement is poured into clean, heated test tubes, cooled and the cement stick sealed in the tubes with masking tape for storage. The cement has a softening point of 200° F., a cementing temperature of less than 250° F. and is a rigid solid at 160° F. The index of refraction of the cement is 1.493 compared with 1.473 for the cellulose caprate.

*Example 2*

When in the procedure of the preceding example there is used a ratio of 3 parts instead of 4 parts of the poly-α-methylstyrene, the cement has a somewhat higher softening point, namely, 213° F., and a slightly lower index of refraction, namely 1.490. The cement has a cementing temperature below 250° F. and is a rigid solid at 160° F.

*Example 3*

In the manner of Example 1, 80 parts of poly-α-methylstyrene and 20 parts of N-cyclohexyl-p-toluenesulfonamide in solution in 50 ml. of toluene (C. P.) is filtered into 100 parts of highly purified and decolorized cellulose caprate of melting point 210° F. in solution in 600 ml. of toluene (C. P.) contained in a 1-liter evaporation flask. The solvent is evaporated by heating the liquid mixture under a vacuum in the manner described above. On cessation of frothing and in the form of a bubble-free melt, the cement is poured into a suitable container and when cooled is a slightly tacky solid. The cement is sufficiently fluid at 125° F. to cement together a plastic optical assembly composed of a polystyrene and a Lucite lens in a bond which will withstand the above-described sheer test at 68–70° F. (room temperature).

Following the procedure of Example 3 and using instead, 160 parts of poly-α-methylstyrene and 40 parts of N-cyclohexyl-p-toluenesulfonamide for each 100 parts of the cellulose caprate of melting point 210° F., a very tacky cement is obtained which can be used for the cementing together of plastic lenses or of plastic lenses to glass lenses without the use of heat to soften the cement. Pressure contact with the fingers on the cemented lens assembly can be used to force out air bubbles trapped in the cement or the assembly can be treated in a vacuum chamber for this purpose. Optical assembles bonded with this very tacky cement require jigging to prevent slippage of the lenses.

The procedure for cementing of optical glass elements with the new thermoplastic cements follows that used for cementing with solid Canada balsam. The clean glass elements are assembled and heated on a hot plate and, after being brought to temperature, the stick of cement is applied to the upper surface of the lower glass piece, the top element is placed on the cement coated lower element and with slight pressure and movement, bubbles and excess cement are worked out. The cemented elements are centered and cooled on the centering device until set. The temperature at the cementing surface of the lower optical glass element is raised to 200° F. for a cement as described in Example 1 above and to 215° F. for a cement as described in Example 2 above, the temperature of the hot plate surface ranging from 200° F. to above 250° F. depending on the shape, size and thickness of the optical glass elements to be heated.

Annealing of the cemented optical glass assembles can be carried out at lower temperatures and over a much shorter period of time than required for glass assemblies cemented with the prior art cellulose caprate cement. For example, matched doublets with an optically flat surface on the flint were cemented one pair with a cement made as in Example 1 above 210° F. and the other pair with the prior art cellulose caprate cement, and centered. The doublets were then annealed to relieve strain in the glass caused by setting of the cement. The doublet with the new cement was annealed for one, two and three hours at 190° F. The doublets were separated, recemented and centered after each of the annealing periods. The strain was greatly relieved by annealing for one hour, more so after two hours and in most cases the strain was entirely removed on annealing for 3 hours. The doublet cemented with the unplasticized cellulose caprate of the prior art required annealing five hours at 212° F. for entire removal of the strain due to setting of the cement.

The use of cements of the invention makes it possible to cement large glass lenses without inducing excessive strain which would cause breakage of the lens.

Since the invention described herein may be variously practiced without departing from the spirit or scope thereof, it is to be understood that specific embodiments of the invention appearing in the above description are to be taken as illustrative only and not limiting except as may be defined in the following claims.

What is claimed is:

1. A solid thermoplastic composition consisting essentially of cellulose caprate of melting point at least about 210° F. plasticized with an amount of viscous liquid poly-α-methylstyrene and N-cyclohexyl-p-toluenesulfonamide which in the aggregate is up to about twice the weight of the cellulose caprate and forms with the latter a composition of lower melting point and higher index of refraction than the cellulose caprate and which melts to at least a fairly thin fluid at a temperature not above about 250° F., and the amount of the N-cyclohexyl-p-toluenesulfonamide is sufficient to render the composition clear in the solid condition and is present in the ratio of from about 1:4 to 1:1 parts by weight of the poly-α-methylstyrene.

2. A solid thermoplastic composition consisting essentially of cellulose caprate of melting point at least about 210° F. plasticized with a minor proportion of viscous liquid poly-α-methylstyrene and of N-cyclohexyl-p-toluenesulfonamide which in the aggregate is up to about 20% of the weight of the cellulose caprate and forms with the latter a composition of lower melting point and higher index of refraction than the cellulose caprate and which melts to a fairly thin fluid at a temperature not above about 250° F. and is a rigid solid at about 160° F., and the amount of the N-cyclohexyl-p-toluenesulfonamide is sufficient to render the composition clear in the solid condition and is present in the ratio of from about 1:4 to 1:1 parts by weight of the poly-α-methylstyrene.

3. A solid thermoplastic composition consisting essentially of cellulose caprate of melting point within the range of about 210 to 240° F. plasticized with from about 12 to 20% by weight of viscous liquid poly-α-methylstyrene and with from about 3 to 20% by weight of N-cyclohexyl-p-toluenesulfonamide which in the aggregate with the cellulose caprate forms a composition which melts to at least a fairly thin fluid at a temperature not above about 250° F. and is a rigid solid at about 160° F., and the amount of the N-cyclohexyl-p-toluenesulfonamide is sufficient to render the composition clear in the solid condition.

4. A tacky solid thermoplastic composition consisting essentially of cellulose caprate of melting point at least about 210° F. plasticized with an amount of viscous liquid poly-α-methylstyrene and N-cyclohexyl-p-toluenesulfonamide which in the aggregate is from about once to twice the weight of the cellulose caprate and forms therewith a tacky composition which melts to a fairly thin fluid at a temperature substantially below 250° F., and the amount of the N-cyclohexyl-p-toluenesulfonamide is sufficient to render the composition clear in the solid condition and is present in the ratio of from about 1:4 to 1:1 parts by weight of the poly-α-methylstyrene.

5. Lens elements bonded together with a thermoplastic cement composition as defined in claim 1.

6. A method of preparing a thermoplastic composition which comprises plasticizing cellulose caprate to a composition of lower melting point and higher index of refraction with viscous liquid poly-α-methylstyrene and N-cyclohexyl-p-toluenesulfonamide in an aggregate amount up to about twice the weight of the cellulose caprate, the N-cyclohexyl-p-toluenesulfonamide being in the ratio of from about 1:4 to 1:1 parts by weight of the poly-α-methylstyrene and sufficient to improve the compatibility of the poly-α-methylstyrene with the cellulose caprate.

References Cited in the file of this patent

UNITED STATES PATENTS

| | | |
|---|---|---|
| 1,467,030 | Edwards | Sept. 4, 1923 |
| 2,180,281 | Kyrides | Nov. 14, 1939 |
| 2,320,375 | Moulton | June 1, 1943 |
| 2,453,665 | Kropa | Nov. 9, 1948 |